United States Patent [19]

Larson et al.

[11] Patent Number: 5,066,429

[45] Date of Patent: Nov. 19, 1991

[54] METHOD FOR PASSIVATING URANIUM OXIDES TO CONTROL OXIDATION, AND THE OXIDATION RESISTING URANIUM PRODUCT THEREOF

[75] Inventors: Richard I. Larson, Wilmington; Richard P. Ringle, Scotts Hill; John L. Harmon, Wilmington, all of N.C.

[73] Assignee: General Electric Company, San Jose, Calif.

[21] Appl. No.: 596,433

[22] Filed: Oct. 12, 1990

Related U.S. Application Data

[63] Continuation of Ser. No. 232,965, Aug. 17, 1988, abandoned.

[51] Int. Cl.[5] .................................................. C01G 43/00
[52] U.S. Cl. ..................................... 264/0.5; 423/260; 423/261; 423/253
[58] Field of Search ................. 423/260, 261, 253; 264/0.5

[56] References Cited

U.S. PATENT DOCUMENTS

| | | | |
|---|---|---|---|
| Re. 33,243 | 6/1990 | Braun et al. | 264/0.5 |
| 3,761,547 | 9/1973 | Grossman et al. | 264/0.5 |
| 4,572,810 | 2/1986 | LeBanc, Jr. | 423/260 |
| 4,617,158 | 10/1986 | Braun et al. | 264/0.5 |
| 4,751,098 | 6/1988 | Parks et al. | 427/6 |
| 4,871,479 | 10/1989 | Bachelard et al. | 264/0.5 |
| 4,929,589 | 5/1990 | Martin et al. | 502/406 |

FOREIGN PATENT DOCUMENTS 646474  8/1962  Canada ................................ 423/261

OTHER PUBLICATIONS

Bannister, J. Nucl. Materials, "The Storage Behavior of Uranium Dioxide Powder", vol. 26, 174–184 (1968).

Primary Examiner—Edward A. Miller
Attorney, Agent, or Firm—Robert R. Schroeder

[57] ABSTRACT

A process for controlling the oxidation reaction of oxides of uranium and fixing the ratio of oxygen to uranium in uranium oxide compounds by means of a passification process, and the stabilized uranium oxide compounds produced therefrom. The method is especially useful in the production of uranium oxide fuel for nuclear reactors.

25 Claims, 4 Drawing Sheets

METHOD FOR PASSIVATING URANIUM OXIDES TO CONTROL OXIDATION, AND THE OXIDATION RESISTING URANIUM PRODUCT THEREOF

This is a continuation of application Ser. No. 07/232,965, filed 17 August 1988, and now abandoned.

FIELD OF THE INVENTION

This invention relates generally to the manufacture of fissionable nuclear fuel comprising oxides of enriched uranium for use in nuclear reactors. Low oxygen ratio uranium oxides such as uranium dioxide typically exhibit a strong propensity for continuing oxidation which often results in deleterious properties for fuel processing and/or service. The invention is particularly concerned with measures for controlling or preserving a desired oxygen to uranium ratio introduced into newly formed particulate uranium oxides, and effectively precluding subsequent spontaneous oxidation of the oxygen susceptible uranium when thereafter subjected to processing operations which frequently entail conditions that foster oxidation.

BACKGROUND OF THE INVENTION

Fissionable fuel grade uranium oxides for service in power generating nuclear reactors are commonly produced from uranium hexafluoride. There are two basic chemical procedures practiced in the industry for commercially carrying out this chemical conversion of uranium hexafluoride to uranium oxides for reactor fuel, and several variations on each.

One principal chemical conversion process is commonly referred to in this art as a "wet" process since the conversion reactions are affected by or carried out within an aqueous medium or liquid phase with the reactants in solution and/or as a solid suspension therein. Typically, this so-called wet process comprises hydrolyzing uranium hexafluoride ($UF_6$) in liquid water to form the hydrolysis product uranyl fluoride ($UO_2F_2$), adding ammonium hydroxide to the uranyl fluoride to precipitate the uranyl fluoride as solid ammonium diuranate [$(NH_4)_2 U_2O_7$], then dewatering the solids and calcining in a reducing atmosphere to produce an oxide of uranium (e.g. $UO_2$). This version of the wet process is frequently referred to as the "ADU" procedure since it normally entails the formation of ammonium diuranate.

The other principal chemical conversion process is commonly referred to in this art as the "dry" process since the reactions are mainly carried out in a gaseous medium and comprise vapor-phase reactions with respect to the components. Typically, this so-called dry process comprises either a one-step procedure or a two-step procedure. The one-step method simply consists of contacting uranium hexafluoride gas ($UF_6$) with a mixture of steam and hydrogen gas within a fluidized bed of particulate uranium oxide whereby solid uranium oxides (e.g. $U_3O_8$) and hydrogen fluoride (HF) are produced. The $U_3O_8$ is subsequently calcined in a reducing atmosphere to a lower oxide of uranium, e.g. $UO_2$. The two-step method consists of hydrolyzing uranium hexafluoride gas ($UF_6$) with steam to produce uranyl fluoride ($UO_2F_2$) followed by reducing the uranyl fluoride with both steam and hydrogen gas to an oxide of uranium (e.g. $UO_2$).

The uranium oxides commercially produced by such conventional methods comprise a fine relatively porous powder which is not suitable as such for use as fuel in a nuclear reactor. Typically, it is not a free-flowing, relatively uniform sized powder, but rather clumps and agglomerates of particles of varying sizes making it unsuitable to uniformly pack into units of an apt and consistent density These uranium oxide powders often have very high particle surface areas.

Thus, the raw uranium oxide product derived from the chemical conversion is normally processed through conventional powder refining procedures such as milling and particle classification to provide an appropriate sizing of the powders. Such processing frequently includes blending of uranium oxide powders of different particle sizes or ranges and from different sources. Commonly the powdered uranium oxides are handled and conveyed through such processing operations by pneumatic means. Thus, the uranium oxides can be subjected to extensive exposure to air, and in turn, oxygen.

Aptly processed uranium oxide powders are press molded into "green" or unfired pellets which are subsequently sintered to fuse the discrete powder particles thereof into an integrated body having a unit density of about 98 percent of theoretical for the oxide of uranium, and suitable for utilization in the fuel system of a nuclear reactor.

Uranium dioxide is an exception to the law of definite proportions since "$UO_2$" actually denotes a single, stable phase that may vary in composition from $UO_{1.7}$ to $UO_{2.25}$. The thermal conductivity of uranium oxide decreases with increasing oxygen to uranium ratios. Thus, uranium dioxide having as low an O/U ratio as practical is preferred for use as fuel in nuclear reactors to enable the most efficient passage of heat generated within fissioning fuel material outward to an external heat transfer medium. However, since uranium dioxide powder oxidizes readily in air and absorbs moisture, the oxygen to uranium (O/U) ratio of the powder will increase significantly to an excess of that acceptable for use as nuclear fuel for effective operation of a nuclear reactor.

Uranium oxides suitable for fuel in typical nuclear reactor service can have an O/U ranging from about 1.70-2.015 to 1, and as a practical matter, an O/U ratio of approximately 2.0 and effectively as high as 2.015 has been used since it can be consistently produced in commercial sintering operations. In some instances, it may be practical to maintain the O/U ratio of the uranium dioxide at a level higher than about 2.00 at sintering temperature. For example, it may be more suitable under the particular manufacturing process to produce a nuclear fuel having an O/U ratio as high as 2.195, and then later treat the sintered product in a reducing atmosphere to obtain the desire U/O ratio. However, such an extra operation usually increases costs without added benefits.

Uranium oxides of low O/U ratios exhibit an especially high propensity for spontaneous oxidation to a higher ratio, or actual burning in air, which can be hazardous as well as introducing deleterious properties in the uranium oxides for their intended service. The magnitude of this affinity for oxidation of uranium and the rate of the oxidizing reaction is influenced by a number of conditions, in particular ambient temperatures, oxygen partial pressure and surface area of the oxide of uranium particles. Moreover, since the oxidation reaction of uranium is exothermic, the oxidation of uranium and the rate thereof is self-propagating and accelerating.

This proclivity to further oxidation of uranium oxides presents a significant factor, or potential problem when particulate oxides of uranium are stored or undergo processing such as milling, classifying or blending in unprotected atmospheres not excluding oxygen.

The presence of a high oxygen content in uranium oxides is known to modify its behavior in both processing or fabrication, and in performance of nuclear fuel. For instance, an oxygen ratio in excess of the uranium dioxide $U/O_2$ stoichiometric ratio has a decided effect upon the sintering rate of uranium-oxides by accelerating its completion, and/or enabling temperature reduction.

On the other hand, a high oxygen content in uranium oxide utilized as nuclear fuel in a reactor is generally overall detrimental A high oxygen ratio in uranium oxide nuclear fuel reduces the thermal conductivity of the fuel mass, increases the diametral expansion of the body of fuel under irradiation conditions during operation within a nuclear reactor, and the ratio of fission products released from the uranium oxide fuel is increased, among other effects.

The influence of oxygen content upon uranium oxide nuclear fuel is considered in detail in an article entitled "The Storage Behavior of Uranium Dioxide Powders" by M. J. Bannister, *Journal of Nuclear Materials*, 26 (1968), pages 174–184.

SUMMARY OF THE INVENTION

This invention includes a method of inhibiting the spontaneous and uncontrolled oxidation, or pyrophoric reaction of oxides of uranium, which comprises passivating the surface of particles of uranium oxides with the formation of a hydrate compound thereover, and the passivated particulate oxide of uranium product of the method. The method entails subjecting particulate oxides of uranium to a controlled oxidation reaction system consisting of a precise combination of conditions that provides an oxidation resisting protective surface over the particles of uranium oxide to preserve the existing oxygen/uranium ratio of thermodynamically unstable uranium oxides.

The method of this invention provides a uranium oxide product exhibiting a stabilized oxygen content substantially of the level initially introduced therein and which can be further handled, stored and/or processed in air or other oxygen containing atmospheres without significant changes or increases in the O/U ratio.

OBJECTS OF THE INVENTION

It is a primary object of this invention to provide means for preventing the spontaneous or uncontrolled surface oxidation, or pyrophoric reaction of uranium oxides.

It is also an object of this invention to provide a treatment for thermodynamically unstable oxides of uranium which fixes and preserves the O/U ratio of uranium oxide.

It is an additional object of this invention to provide a method for passivating the surface of particulate oxides of uranium with an oxidation resisting protective hydrate surface.

It is a further object of this invention to provide a method for forming protective hydrate surface layers on particulate oxides of uranium that inhibit oxygen chemisorption on exposed surface areas of particulate uranium oxide.

It is a still further object of this invention to provide oxides of uranium in particulate form which are resistant to oxidation and stable when handled, stored or processed in air or other oxidizing atmospheres.

It is another object of this invention to provide unstable particulates oxides of uranium with lasting resistance to uncontrolled oxidation of the particle surfaces, including high surface area particles.

DETAILED DESCRIPTION OF THE INVENTION

Figure 1:
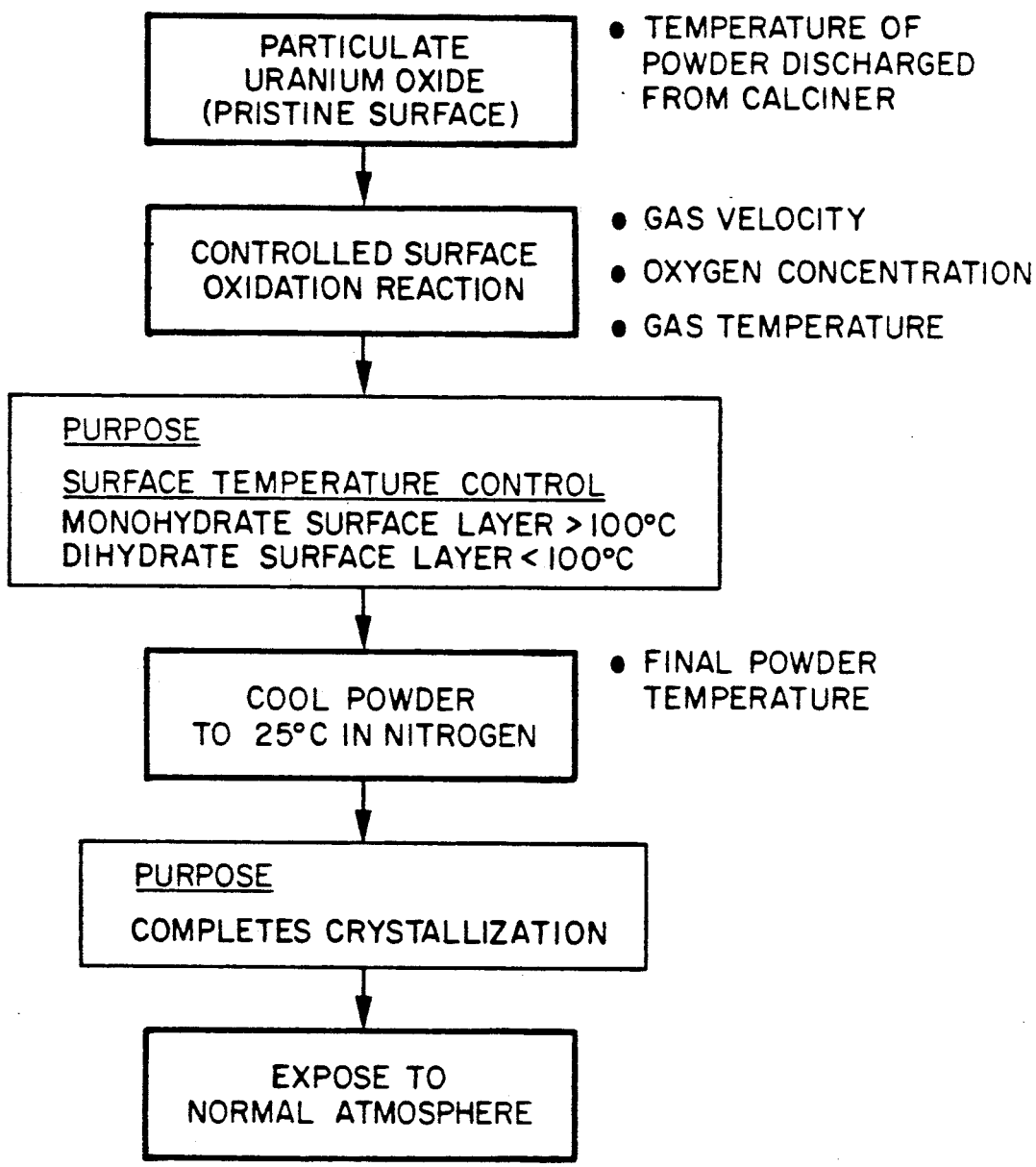
FIG. 1 of the drawings comprises a flow sheet block diagram of the process steps for the practice of the method of the invention.

This invention comprises the discovery of an effective and practical means for passivating unstable oxides of uranium which enhances the properties of the oxides for subsequent processing and use, without detracting from their beneficial attributes, and the resulting passivated oxygen stable uranium oxides. The means of this invention comprise a combination of a specific sequence of conditions which are applied as a treatment to unstable oxides of uranium to overcome their normal affinity for reacting with oxygen. Specifically, this invention entails subjecting the unstable oxides of uranium to a given atmosphere while maintained at a specific temperature range over a limited period of time. Thereafter the treated uranium oxide is promptly returned to approximately room or ambient temperatures.

The oxides of uranium treated according to this invention typically includes the lower order oxides of uranium comprising those having an oxygen to uranium ratio range of about 1.7 to about 2.25/1, such as uranium dioxide ($UO_2$), and thus which are unstable with a predisposition for oxidation to a higher order, for example to $U_3O_8$, $U_3O_7$, $U_4O_9$, etc. upon exposure to air or other oxidizing atmospheres. A common type of uranium oxides for passivation according to the precepts of this invention consists of newly produced uranium dioxide for use in producing nuclear fuel having the usually desired low order oxide contents of an oxygen ratio of about 1.8 to about 2.2/1 and a relatively pristine exposed particle surface.

The occurrence of high order oxides in the uranium oxides used in the manufacturing operations for producing nuclear fuel causes ceramic defects in the sintered uranium oxide pellets such as nonuniform grain size, large open and closed porosity, low sinter density, pits, and high densification. Accordingly, precautions of one means or another should be employed to preclude oxygen as the source of these problems or to control the inherent affinity of low order oxides of uranium for further oxidation to high levels of oxygen content.

In accordance with this invention, unstable oxides of uranium are subjected to a controlled atmosphere containing minuscule proportions of oxygen with the balance an inert or non-oxidizing gaseous medium, such as argon, nitrogen, carbon dioxide, carbon monoxide, methane and the like, and mixtures thereof. The oxygen content for the treatment of the invention should comprise about 0.03 up to about 3.0 percent by volume of the atmosphere. Preferably for most applications of the invention, the oxygen proportion of the ambient treatment atmosphere is about 0.5 to about 2.0 percent by volume.

This controlled atmosphere of appropriate gaseous mixtures is supplied for contacting the uranium oxides throughout the treatment preferably at a rate of about 0.005 to about 0.010 cubic feet per gram weight of the uranium oxide (5 to 10 ft$^3$/Kg). The treatment of small amounts of uranium oxides can of course be heated with a static controlled atmosphere of adequate volume provided the temperature is maintained within prescribed conditions.

Further, in accordance with this invention, the unstable oxides of uranium, while exposed to the controlled atmosphere with the given oxygen content, are maintained in such an environment while held at a temperature within the range of about 40° to about 250° C. Preferably, the temperature conditions applied for the treatment comprise a range of about 50° up to about 200° C.

The apt temperature conditions for the process are most expediently maintained by removing the thermal energy generated in the exothermic oxidation reaction with the gaseous flow supplying the controlled atmosphere. A substantially continuous flow of the oxygen-containing gas mixture passing through the system in contact with the uranium oxide will convey away unwanted heat and govern the oxidation reaction. Thus, a balance between the rate of oxidation and the rate of heat removal by gas convection is preferred.

The duration for the treatment of oxides of uranium by subjecting to the specified atmosphere and temperature is for a time period of at least about 20 minutes up to about 120 minutes. Preferably, the treatment is carried out over a relatively brief and thus economical time of about 30 minutes up to about 60 minutes, depending of course to a considerable degree upon the capacity of the gas treating equipment and the volume of uranium oxide material undergoing treatment.

The treatment of this invention can be effected in any suitable solid-vapor contact apparatus provided with ambient heat controlling means such as commercial fluid bed contact equipment having internal atmosphere gas flow and controlling means. Other suitable devices for carrying out the method of this invention include rotary cylinder or drum systems designed for countercurrent gas/powder flow, and reactors that provide for powder and gas to continuously flow through the unit. Both fluid bed and rotary reactor systems provide effective particulate solid/gas mixing, which is the major requirement for the needed simultaneous heat and mass transfer with chemical reaction.

The mechanism of this invention, produced by the foregoing imposed conditions of atmosphere, temperature and time, comprises a controlled surface oxidation reaction which produces a protective hydrate surface layer or coating over the uranium oxide particles that inhibits subsequent oxygen chemisorption. The passivating surface of hydrate formed comprises a monohydrate—uranyl hydroxide—($UO_2(OH)_2$) or dihydrate—uranyl hydroxide hydrate—($UO_2(OH)_2 \cdot H_2O$), and typically a combination of both the monohydrate and dihydrate. Moreover, there is evidence of the formation of a second body or intermediate layer between the uranium oxide particle and the protective hydrate surface layer or coating, which is believed to consist of $U_4O_9$ or $UO_{2+x}$.

The proportion of either passivating hydrate formed, monohydrate or dihydrate, is generally controlled by the temperature of the surface of the uranium oxide particles. At a surface temperature of above about 100° C., the controlled oxidation reaction primarily forms the monohydrate. Below about 100° C., the controlled oxidation of the surface primarily forms the dihydrate. The proportion of monohydrate formed increases as the temperature of the surface reaction increases.

The two hydrate compounds, monohydrate and dihydrate, exhibit different properties as shown below:

| | PROPERTIES | |
|---|---|---|
| Description | Monohydrate ($UO_2(OH)_2$) | Dihydrate ($UO_2(OH)_2 \cdot H_2O$) |
| Density | 6.70 | 5.0 |
| Color | Black | Brown |
| Crystal Structure | Two methods of bonding uranyl group | Water interleaved between layers |

The controlled surface oxidation pursuant to the precepts at this invention produces a hydrate layer or coating of a thickness of about 3 to about 10 Angstroms.

Upon completion of the formation of a passivating hydrate layer covering the uranium oxide particles, the treated material should be promptly cooled to room temperature. Cooling quickly to at least about 25° C. completes the crystallization process of the newly formed hydrate and prevents an accelerated rapid continuing oxidation reaction.

The overall combination of the specific sequence of conditions for carrying out the method of this invention is illustrated in the block diagram of basic steps of FIG. 1.

Several of the conditions inherent or imposed in the carrying out of the passivation treatment of this invention, such as initial or pretreatment temperature of the uranium oxide material, treatment atmosphere temperature, surface temperature of the uranium oxide material undergoing treatment, and oxygen concentration of treatment atmosphere, are especially significant in the practice of the method. For example, increases in the proportion of oxygen in the treating atmosphere above about 2 percent by volume significantly raises the rate of oxidation and the surface temperature of the particles of uranium oxide material undergoing treatment.

The surface temperature of the particles of the uranium oxide material during the oxidation treatment is determined by the following conditions:

(1) Rate of diffusion of oxygen from the atmosphere to the surface of the particles of uranium oxide.
(2) Rate of oxidation.
(3) Rate of cooling by the environment.
(4) Specific surface area (particle size) of the particles of uranium oxide.
(5) Temperature of the oxygen containing atmosphere.

Mathematically, these parameters are related by the following equations:

$$T_s = \frac{\text{Heat Produced by Oxidation Reaction}}{\text{Cooling Rate of Gas}} + \text{Gas Temp.} \quad (1)$$

$$T_s = \frac{r(\Delta H)}{hs_p} + T_g \quad (2)$$

Figure 2:
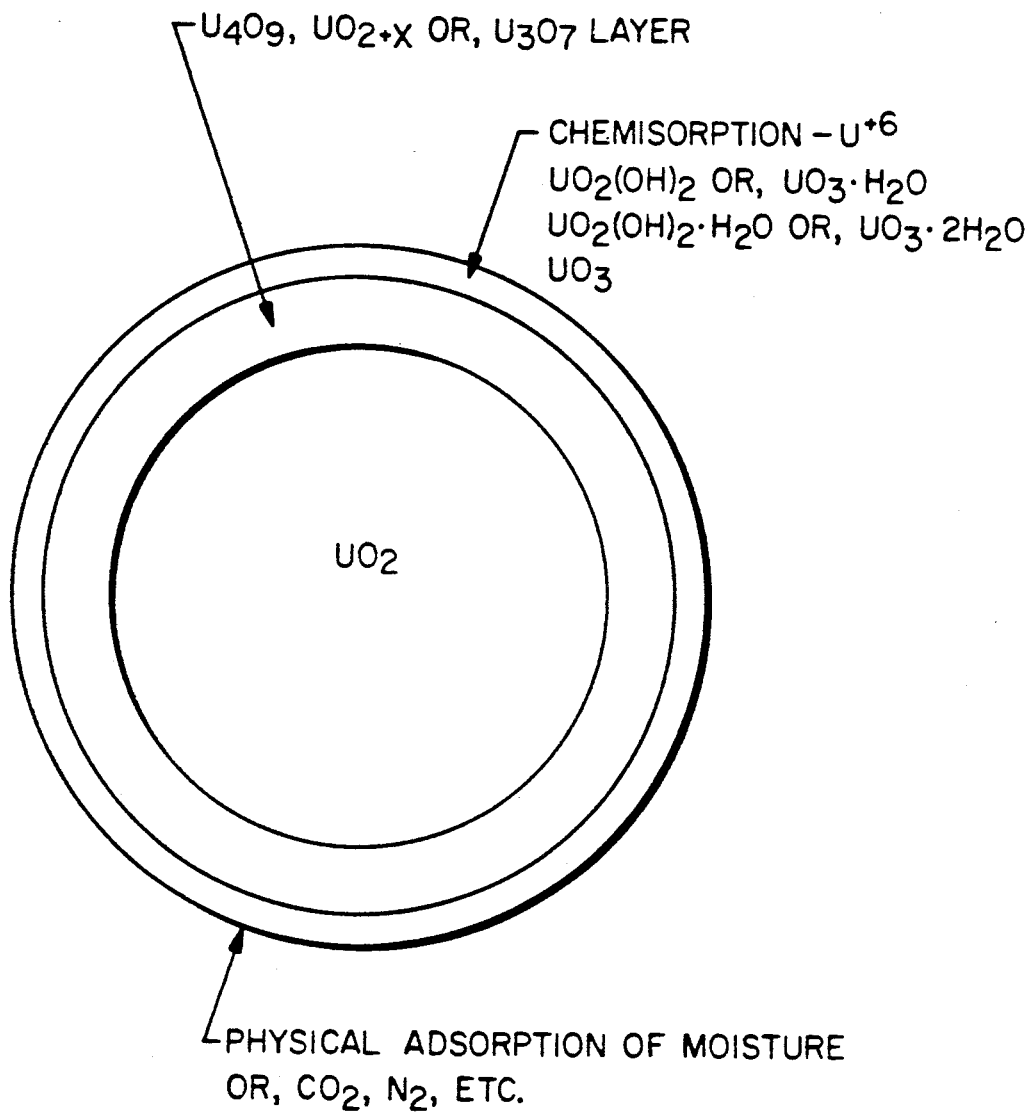
FIG. 2 of the drawing comprises a diagram of a treated product of the invention.

$T_s$ = Surface temperature
$T_g$ = Gas temperature
r = Oxidation rate = $k(v)*C(\%O_2)$
$\Delta H$ = Heat of reaction
h = Heat transfer coefficient $v^{1.3}$
$S_p$ = Specific surface area Experimental measurements demonstrate that the uranium oxide material oxidation rate—r—varies linearly both with the atmospheric movement velocity —v—and oxygen concentration expressed as percent oxygen in the atmosphere—$C(\%O_2)$, note FIG. 2. When multiplied by the heat of reaction ($\Delta H$), the numerator in the first term of equation 2 represents the amount of heat generated by the oxidation reaction.

On the other hand, the cooling rate, controlled by the gas-solid heat transfer coefficient, h, is proportional to velocity to the 1.3 power (1, 2, and 3). These two effects (first term in equation 2) combine to reduce the surface temperature as the velocity is increased at constant oxygen concentration, <1.5 percent. The ratio of heating to cooling (the first term) varies inversely with velocity to the 0.3 power. Consequently, even through the oxidation rate and total heat of reaction increase with velocity, heat transfer to the gas stream is sufficient to cool the powder and reduce the surface temperature at these low oxygen concentrations.

The above gas cooling characteristics provide a means for controlling the oxidation process. In the laboratory, a uniform O/U ratio over a 10 inch, test specimen length was obtained for short oxidation times, a few minutes, and high surface temperatures A monohydrate surface was formed without the presence of high order oxides. This was accomplished by increasing the gas velocity a factor of 50 from 0.3 cm/sec to 16.6 cm/sec.

Thus, as the gas flow velocity in the system approaches zero, the heat of reaction increases the uranium oxide particle temperature substantially, and accelerates the oxidation reaction whereby the uranium oxide may burn. Equation (2) above demonstrates this effect quantitatively.

A low gas velocity or a stagnant gas heat transfer coefficient, such as that which exits in a 5 gallon container, produces a high surface temperature as indicated by the first term in the above equation.

Accordingly, the rate of the surface oxidation is controlled by the velocity of the gas stream and the oxygen concentration thereof. Mass transfer of oxygen to the particle surface controls the reaction rate since the surface oxidation reaction is extremely fast. Consequently, the overall reaction rate is proportional to the velocity.

Figure 3:
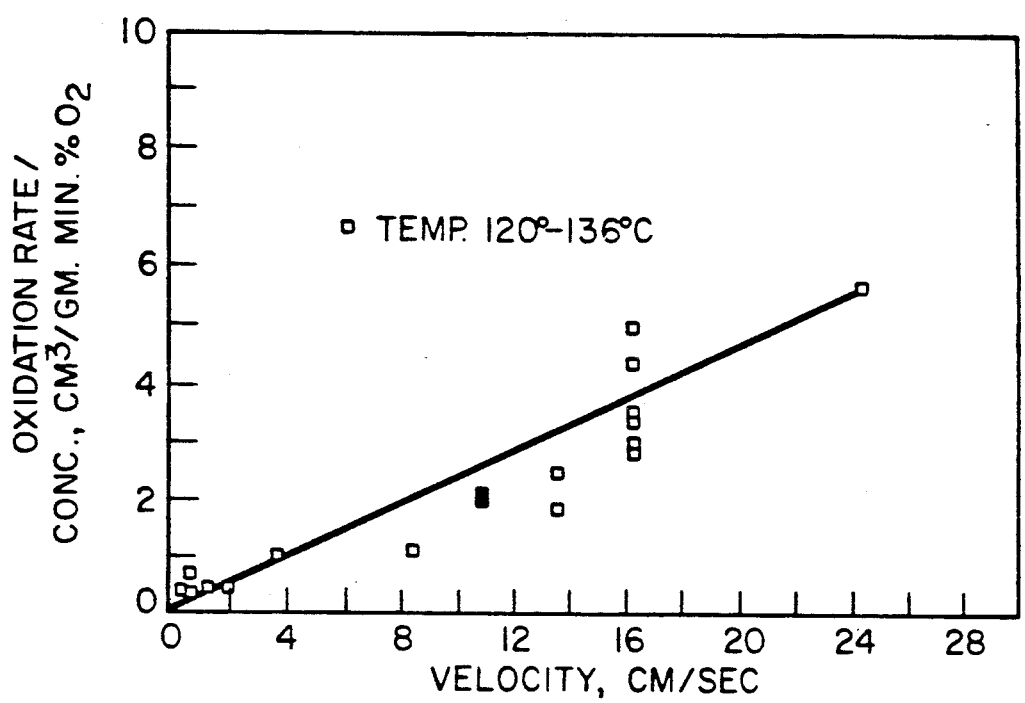
FIG. 3 of the drawings comprises a graph of oxidation rate per gram of uranium dioxide.

The effect of uranium oxide particle surface temperature on the proportion of monohydrate formed thereon is shown in FIG. 3. The monohydrate of the surface layer composition produced increases with surface temperature. Above about 100° C., the composition is over 50 percent monohydrate. Below about 100° C., a higher percentage of the dihydrate surface compound is formed.

To control the type and/or ratios of the hydrates produced in the passivation process of this invention requires some governing of the following conditions:

(1) Initial temperature of the particulate uranium oxide material.
(2) Oxygen concentration of atmosphere.
(3) Velocity of the oxygen containing atmosphere
(4) Atmosphere temperature during the reaction.
(5) Final temperature of treated particulate uranium oxide material.

The effect of a high oxygen concentration in the atmosphere suggests why untreated particulate uranium oxide burns on exposure to air which contains about 20 percent oxygen.

Figure 4:
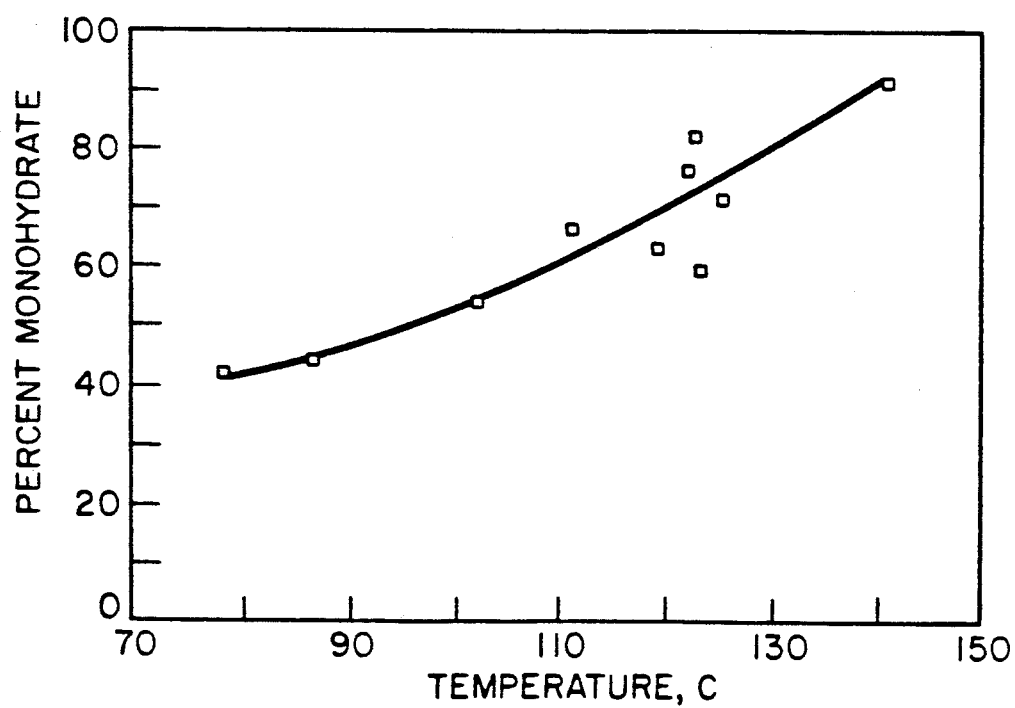
FIG. 4 of the drawings comprises a graph of monohydrate formation with respect to temperatures.
Figure 5:
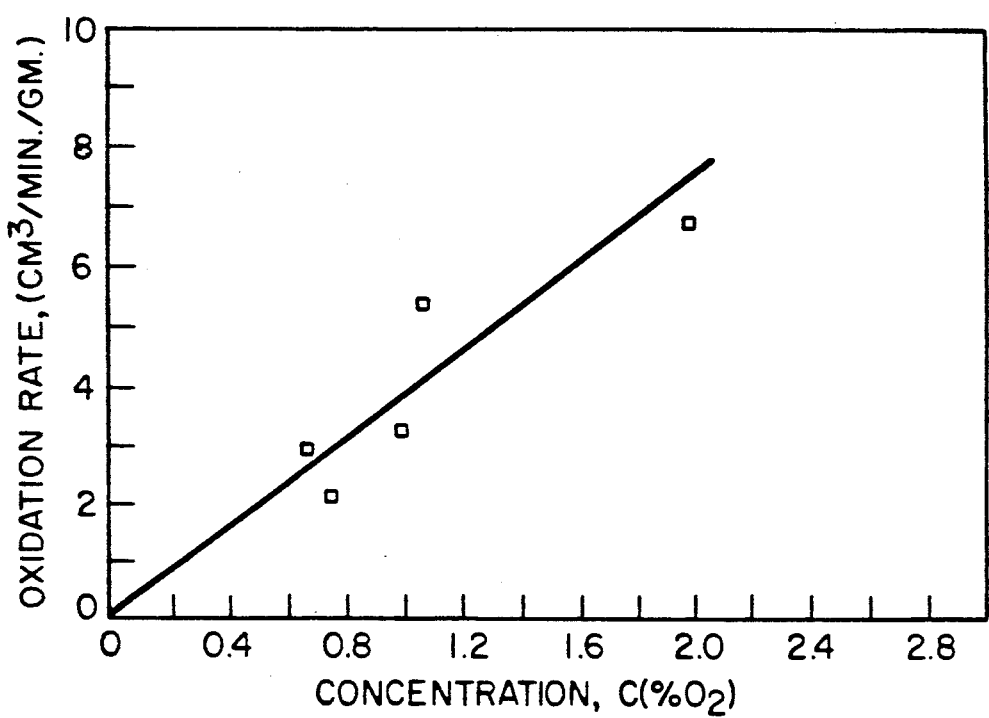
FIG. 5 of the drawings comprises a graph of the effect of the oxygen concentration of the atmosphere upon the oxidation rate.

FIG. 4 shows the linear relationship for the oxidation rate and oxygen concentration with an atmosphere at a velocity of about 16.4 centimeters per second. Based on these factors, the oxidation rate data at other velocities, note FIG. 3, were normalized with respect to a linear oxygen concentration of the atmosphere.

Increasing the oxygen concentration of the atmosphere above about 2.0 percent volume raises the oxidation rate and surface temperature of the uranium oxide particles as shown in equation 2. Moreover high oxygen concentrations are difficult to control because of the relatively weak velocity effect —v—. An increase in the oxygen concentration from 2 percent to 3 percent, and therefore a 50 percent increase in the heating rate, requires at least a factor of four increase in gas velocity to cool the uranium oxide material. Usually, this capacity for cooling is not available and, as a result, uranium dioxide will burn uncontrolled.

Furthermore, if either the hydrate surface layer or coating formed over this particulate uranium oxide material is too thin or its crystallization not completed by cooling down to about 25° C., particulate uranium dioxide remaining at temperatures substantially exceeding 25° C. will burn upon exposure to air.

The hydrate layer or coating produced by the means of this invention covering the surface of the particles of uranium oxide reduce the rate of oxygen diffusion from the air and thus prevent accelerated oxidation, overheating, and eventual burning of the uranium oxide.

An example of process conditions for the practice of the method of this invention, and the characteristics of the thus treated material resulting therefrom are as follows:

EXAMPLE

A nine kilogram sample of newly produced powdered uranium dioxide was subjected to the given passivation treatment conditions in fixed bed gas treatment equipment.

Initial temperature—about 20° C. room temperature.
Oxygen concentration of atmosphere—about 2 percent oxygen with about 98 percent nitrogen
Treatment temperature—50° C. starting temperature plus 113° C. maximum temperature.
Time of treatment—33 minutes.
Amount of oxygen—52328 centimeters squared.
Cooled to about 25° C.

The properties of the above passivation treated uranium oxide product, compared with the same untreated uranium oxide, are given in the following table:

| Surface Layer Chemistry | Uranium Oxide Treatment | |
|---|---|---|
| | Passivation Treatment | Untreated (Normal Production) |
| Percent Monohydrate | 45.1 | 21.2 |
| Percent Dihydrate | 54.9 | 78.8 |
| Hydrate Layer Thickness Angstroms | 6.7 | 3.5 |
| U4O9 Layer Thickness Angstroms | 102.5 | 21.2 |
| O/U | 2.12 | 2.03 |
| Surface Area m2/gm | 2.7 | 2.8 |

HYDRATE LAYER THICKNESS INCREASE
$$\frac{\text{Passivated Powder}}{\text{Normal Production}} = \frac{6.7}{3.5} = 1.9$$
SECOND LAYER, U4O9, THICKNESS INCREASE
$$\frac{\text{Passivated Powder}}{\text{Normal Production}} = \frac{102.5}{21.2} = 4.8$$

what is claimed is:

1. A method of passivating the surface portion of loose particles of moisture absorbing oxides of uranium newly produced in a water containing environment with the formation thereof of a protective hydrate surface layer to inhibit oxygen chemisorption of the particle surface, comprising subjecting the loose particles of moisture absorbent oxides of uranium nominally of uranium dioxide to the combination of conditions consisting essentially of:
   a. an atmosphere containing oxygen in a concentration of about 0.03 to about 3.0 percent by volume;
   b. a temperature within the range of about 40° to about 250° C.; and
   c. for a period of at least about 20 minutes up to about 120 minutes whereby the oxygen interacts with the particle surface of the oxides of uranium containing absorbed moisture to produce a protective hydrate surface layer thereon.

2. The method of claim 1, wherein the particulate oxides of uranium is rapidly cooled down to a temperature of at least about 25° C. after being subjected to the oxygen containing atmosphere and temperature for about 30 to about 120 minutes.

3. The method of claim 1, wherein the particulate oxides of uranium are subjected to a temperature within the range of about 40 to about 100° C.

4. The method of claim 1, wherein the particulate oxides of uranium are subjected to a temperature within the range of about 100 to about 250° C.

5. A method of passivating the surface portion of loose particles of moisture absorbing oxides of uranium newly produced in a water containing environment with the formation thereon of a protective hydrate surface layer to inhibit oxygen chemisorption of the particle surface, comprising subjecting the loose particles of moisture absorbent oxides of uranium nominally of uranium dioxide to the combination of conditions consisting essentially of:
   a. an atmosphere containing oxygen in a concentration of about 0.03 to about 3.0 percent by volume;
   b. a temperature within the range of about 40° to about 250° C.;
   c. for a period of at least about 20 minutes up to about 120 minutes; and
   d. rapidly cooling the particulate oxide of uranium down to at least 25° C. whereby the oxygen interacts with the particle surface of the oxides of uranium containing absorbed moisture to produce a protective hydrate surface layer thereon.

6. The method of claim 5, wherein the particulate oxides of uranium are subjected to a temperature within the range of about 40° to about 100° C. to provide a protective hydrate surface layer on the particle surfaces which is predominantly a dihydrate.

7. The method of claim 5, wherein the particulate oxides of uranium are subjected to a temperature within the range of about 100° to about 250° C. to provide a protective hydrate surface layer on the particle surface which is predominantly a monohydrate.

8. The method of claim 5, wherein the particulate oxides of uranium are subjected to a temperature within the range of about 100° to about 220° C.

9. The method of claim 1, wherein the oxygen concentration of the atmosphere is about 0.5 to about 2.0 percent by volume.

10. A method of passivating the surface portion of particulate oxides of uranium with the formation thereon of a protective hydrate surface layer to inhibit oxygen chemisorption of the particle surface, comprising subjecting particulate oxides of uranium nominally of uranium dioxide to the combination of conditions consisting essentially of:
   a. an atmosphere containing oxygen in a concentration of about 0.5 to about 2.0 percent by volume;
   b. a temperature within the range of about 40° to about 250° C.;
   c. for a period of at least about 20 minutes up to about 120 minutes; and
   d. rapidly cooling the particulate oxide of uranium down to at least 25° C. whereby the oxygen interacts with the particle surface of the oxides of uranium containing absorbed moisture to produce a protective hydrate surface layer thereon.

11. The method of claim 10, wherein the particulate oxides of uranium are subjected to a temperature within the range of 100° to about 250° C. to produce a protective hydrate surface layer on the particle surface which is predominantly a monohydrate.

12. The method of claim 10, wherein the particulate oxides of uranium are subjected to a temperature within the range of about 100° to about 250° C. to produce a protective hydrate surface layer on the particle surface which is predominantly a monohydrate.

13. The method of claim 10, wherein the particulate oxides of uranium are subjected to the oxygen containing atmosphere and temperature for a period of about 30 minutes to about 60 minutes.

14. The method of claim 10, wherein the atmosphere contains oxygen in a concentration of about 2.0 percent by volume.

15. A method of passivating the surface portion of particulate oxides of uranium with the formation thereon of a protective hydrate surface layer to inhibit oxygen chemisorption of the particle surface, comprising subjecting loose particles of moisture absorbing oxides of uranium newly produced in a water containing environment with the formation thereon of a protective hydrate surface layer to inhibit oxygen chemisorption of the particle surface, comprising subjecting the loose particles of moisture absorbent oxides of uranium nominally of uranium dioxide to the combination of conditions consisting essentially of:
   a. an atmosphere containing oxygen in a concentration of about 2.0 percent by volume;

b. a temperature within the range of about 50° to about 200° C.;

c. for a period of at least about 20 minutes up to about 60 minutes; and d. rapidly cooling the particulate oxide of uranium down to at least 25° C. whereby the oxygen interacts with the particle surface of the oxides of uranium containing absorbed moisture to produce a protective hydrate surface layer thereon.

16. The method of claim 15, wherein the particulate oxides of uranium are subjected to a temperature within the range of about 50° to about 100° C. to produce a protective hydrate surface layer on the particulate surface which is predominantly a dihydrate.

17. The method of claim 15, wherein the particulate oxides of uranium are subjected to a temperature within the range of about 100° to about 200° C. to produce a protective hydrate surface layer on the particle surface which is predominantly a monohydrate.

18. The method of claim 15, wherein the atmosphere containing about 2.0 percent by volume of oxygen is applied in a continuous flow whereby heat of the oxidation reaction is removed simultaneous with the reaction.

19. The method of claim 15, wherein the atmosphere containing oxygen is applied at a flow rate of about 0.005 to about 0.010 cubic feet per gram weight of the uranium oxide.

20. A method of passivating the surface portion of loose particles of moisture absorbing oxides of uranium newly produced in a water containing environment with the formation thereon of a protective hydrate surface layer to inhibit oxygen reaction with the oxides of uranium, comprising subjecting loose particles of moisture absorbent oxides of uranium to the combination of conditions consisting essentially of:

a. an atmosphere containing oxygen in a concentration of about 0.03 to about 3.0 percent by volume applied at a continuous flow rate of 0.005 to about 0.010 cubic feet per gram weight of the particulate oxides of uranium;

b. a temperature within the range of about 40° to about 250° C.;

c. for a period of at least about 20 minutes up to about 120 minutes; and d. rapidly cooling the particulate oxide of uranium down to at least 25° C. whereby the oxygen interacts with the particle surface of the oxides of uranium containing absorbed moisture to produce a protective hydrate surface layer thereon.

21. The method of claim 20, wherein the particulate oxides of uranium are subjected to a temperature within the range of about 40° to about 100° C. while subjected to the atmosphere to provide a protective hydrate surface layer on the particle surface which is predominantly a dihydrate.

22. The method of claim 20, wherein the particulate oxides of uranium are subjected to a temperature within the range of about 100° to about 250° C. while subjected to the atmosphere to provide a protective hydrate surface layer on the particle surface which is predominantly a monohydrate.

23. The method of claim 20, wherein the particulate oxides of uranium are subjected to a temperature within the range of about 100° to about 220° C. while subjected to the atmosphere.

24. The method of claim 20, wherein the oxygen concentration of the atmosphere is about 0.5 to about 2.0 percent by volume.

25. The method of claim 20, wherein the particulate oxides of uranium are subjected to the oxygen containing atmosphere for a period of about 30 minutes to about 60 minutes.

* * * * *